(12) United States Patent
Anderson (10) Patent No.: US 12,024,885 B2
(45) Date of Patent: Jul. 2, 2024

(54) BASALT FIBER COMPOSITE REBAR AND METHOD OF MANUFACTURING

(71) Applicant: BASANITE INDUSTRIES LLC, Pompano Beach, FL (US)

(72) Inventor: David Anderson, Coconut Creek, FL (US)

(73) Assignee: Basanite Industries LLC, Pompano Beach, FL (US)

(*) Notice: Subject to any disclaimer, the term of this patent is extended or adjusted under 35 U.S.C. 154(b) by 0 days.

(21) Appl. No.: 18/024,425

(22) PCT Filed: Sep. 13, 2021

(86) PCT No.: PCT/US2021/050116
§ 371 (c)(1),
(2) Date: Mar. 2, 2023

(87) PCT Pub. No.: WO2022/056410
PCT Pub. Date: Mar. 17, 2022

(65) Prior Publication Data
US 2023/0257995 A1    Aug. 17, 2023

Related U.S. Application Data

(60) Provisional application No. 63/077,464, filed on Sep. 11, 2020.

(51) Int. Cl.
*E04C 5/07* (2006.01)
*B29C 70/52* (2006.01)
(Continued)

(52) U.S. Cl.
CPC .............. *E04C 5/07* (2013.01); *B29C 70/521* (2013.01); *B29K 2063/00* (2013.01); *B29K 2309/00* (2013.01); *B29L 2031/06* (2013.01)

(58) Field of Classification Search
CPC .............................. B29C 70/521; B32B 13/02
See application file for complete search history.

(56) References Cited

U.S. PATENT DOCUMENTS

| 5,851,468 A | 12/1998 | Kaiser | |
|---|---|---|---|
| 2002/0121720 A1* | 9/2002 | Davies | B29C 70/24 264/129 |

(Continued)

FOREIGN PATENT DOCUMENTS

| JP | 2008274667 A | * 11/2008 | |
|---|---|---|---|
| JP | 2008274667 A | 11/2008 | |
| WO | WO-2014182825 A2 | * 11/2014 | B29C 43/06 |

OTHER PUBLICATIONS

"JP2008274667_Machine Translation" is a machine translation of JP-2008274667-A. (Year: 2008).*

*Primary Examiner* — Babajide A Demuren
(74) *Attorney, Agent, or Firm* — Mark C. Johnson; Johnson |Dalal (57) ABSTRACT

A basalt fiber composite rebar and method of manufacturing the same that includes producing an elongated body with an outer surface, two opposing terminal ends, a longitudinal length separating the two opposing terminal ends of the elongated body, of an epoxy matrix having a plurality of longitudinally oriented and twisted basalt fibers independently embedded and bonded therein and continually spanning along the longitudinal length, and a basalt fiber overlay directly coupled to the outer surface of the elongated body in a spiral configuration to define a plurality of fiber ribs spatially displaced from one another along the longitudinal length.

10 Claims, 9 Drawing Sheets

(51) Int. Cl.
   *B29K 63/00*      (2006.01)
   *B29K 309/00*     (2006.01)
   *B29L 31/06*      (2006.01)

(56) References Cited

U.S. PATENT DOCUMENTS

| | | | |
|---|---|---|---|
| 2002/0121722 A1* | 9/2002 | Davies | B29C 70/521 |
| | | | 264/129 |
| 2002/0134690 A1 | 9/2002 | Lyublinski | |
| 2004/0001941 A1* | 1/2004 | Kusek | B29C 70/521 |
| | | | 428/292.1 |
| 2007/0006961 A1* | 1/2007 | Kusek | B29C 63/105 |
| | | | 156/169 |
| 2012/0076969 A1 | 3/2012 | Ponomarev | |
| 2013/0239503 A1 | 9/2013 | Miller | |
| 2014/0332996 A1 | 11/2014 | Neuvokas | |

\* cited by examiner

BASALT FIBER COMPOSITE REBAR AND METHOD OF MANUFACTURING

FIELD OF THE INVENTION

The present invention relates generally to composite reinforced building structures, namely rebar, with improved mechanical properties and methods of manufacturing the same.

BACKGROUND OF THE INVENTION

To create a structurally sound and resilient building structure, many users generally construct the walls and foundation of said building structure with concrete. Concrete, while superior in dealing with compression forces, is susceptible to failure when subjected to tensile forces. To address said issue, many users utilize a reinforcing material therein that is superior in dealing with tensile forces. In some embodiments, the reinforcing material is a steel bar ("rebar") or mesh of steel wires ("welded wire mesh") is used as a tension device in the concrete and masonry structures to strengthen and aid the concrete under tension. Rebar surface is often "deformed" with ribs, lugs, or indentations to promote a better bond with the concrete and to reduce the risk of slippage in current building structures. Over a period of time, typical steel rebar or mesh is prone to corrosion, requiring replacement or, even worst, leads to failure. As such, many users are looking for non-corrosive reinforcement materials for use with concrete.

Therefore, a need exists to overcome the problems with the prior art as discussed above.

SUMMARY OF THE INVENTION

The invention provides a basalt fiber composite rebar and method of manufacturing that overcomes the hereinaforementioned disadvantages of the heretofore-known devices and methods of this general type and that enables safe, effective, and efficient production and utilization of the basalt fiber composite rebar.

With the foregoing and other objects in view, there is provided, in accordance with the invention, a basalt fiber composite rebar having an elongated body with an outer surface, with two opposing terminal ends, with a longitudinal length separating the two opposing terminal ends of the elongated body, of an epoxy matrix having a plurality of longitudinally oriented and twisted basalt fibers independently embedded and bonded therein and continually spanning along the longitudinal length, and a basalt fiber overlay directly coupled to the outer surface of the elongated body in a spiral configuration to define a plurality of fiber ribs spatially displaced from one another along the longitudinal length.

In accordance with another feature, an embodiment of the present invention includes the epoxy matrix having a nanometer-sized filler and tougheners disposed therein.

In accordance with yet another feature, an embodiment of the present invention also includes the nanometer-sized filler is of an inert material that includes at least one from a group consisting of a basalt fines, wollastonite ($CaSiO_3$), bauxite (aluminum oxide), zirconium or titanium oxides, or activated black carbon.

In accordance with a further feature of the present invention, the resin-to-fiber in any given cross section along the longitudinal length of the elongated body is approximately 1:4.

In accordance with an additional feature of the present invention, the elongated body is of a slender configuration and of a cylindrical shape. Further, the plurality of basalt fibers may continually span the entire longitudinal length of the elongated body.

In accordance with a further feature of the present invention, the plurality of fiber ribs are configured in an equally spaced longitudinal length and radial length configuration with one another.

In accordance with an exemplary feature of the present invention, the plurality of fiber ribs are spaced longitudinally with 28-34 spirals per foot.

In accordance with another feature, an embodiment of the present invention also includes the outer surface of the elongated body having a carbon coating evenly applied to the entire outer surface of the basalt fiber composite rebar.

In accordance with yet another feature of the present invention, the basalt fiber overlay and the plurality of twisted basalt fibers each have a size of approximately 2000-4800 tex.

Also in accordance with the present invention, a method of manufacturing basalt fiber composite rebar is disclosed that includes the steps of providing a creel rack assembly with a plurality of bobbins retained thereon, each of the plurality of bobbins including basalt fiber roving strand thereon, pultruding the basalt fiber roving strands under tension from each of the plurality of bobbins and guiding the basalt fiber strands to and through a heated roving preparation station, pultruding, after the heated station, the basalt fiber roving strands through a resin bath and coating the basalt fiber roving strands with an epoxy resin matrix, twisting, after the resin bath, the coated basalt fiber roving strands together in a "Z" direction and guiding the coated and twisted coated basalt fiber roving strands to one or more forming dies generating an elongated body with an outer surface, wrapping a basalt fiber strand in an "S" direction, as a circumferential retaining element over the outer surface of the elongated body in a spiral configuration to define a plurality of fiber ribs spatially displaced from one another along a longitudinal length of the elongated body, and curing the wrapped elongated body in an oven assembly by heating the wrapped elongated body through multiple stages above the glass transition temperature of the epoxy material, thereby forming an epoxy matrix with a plurality of longitudinally oriented and twisted basalt fibers independently embedded and bonded therein.

In accordance with an additional feature of the present invention, the process includes pultruding the basalt fiber roving strand under tension from the plurality of bobbins to form a single horizontal plane before the coating, thus beneficially providing equal tension and preparation of the strands making up the bar.

In accordance with an additional feature of the present invention, the process also includes deckling down the basalt fiber roving strands using at least one separator operably coupled to the basalt fiber roving strands before the resin bath.

In accordance with yet another feature of the present invention, the process also includes pultruding the basalt fiber roving strands through a separator disposed before the resin bath and after the resin bath.

In accordance with an additional feature of the present invention, the process also includes twisting the coated basalt fiber roving strands in a counterclockwise direction with respect to the direction of the pultruding.

In accordance with yet another feature of the present invention, the process also includes wrapping the basalt fiber strand over the outer surface of the elongated body in a clockwise direction to form the spiral configuration.

In accordance with yet another feature of the present invention, the process also includes wrapping the basalt fiber strand over the outer surface of the elongated body as a circumferential retaining element while the basalt fiber roving strands is pultruding.

In accordance with a further feature of the present invention, the process also includes wrapping the basalt fiber strand over the outer surface of the elongated body at a rate directly associated with a rate of pultruding of the basalt fiber roving strands.

In accordance with yet another feature of the present invention, the process also includes pultruding, after wrapping the basalt fiber strand over the outer surface of the elongated body in the spiral configuration, the elongated body through an air misting chamber and subjecting the wrapped elongated body with a dry coating to add surface area when evenly applied to the entire outer surface of the elongated body.

Although the invention is illustrated and described herein as embodied in a basalt fiber composite rebar, it is, nevertheless, not intended to be limited to the details shown because various modifications and structural changes may be made therein without departing from the spirit of the invention. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the body of the composite rebar, wherein "transverse" should be understood to mean a direction corresponding to a direction of side-to-side of the composite rebar. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The invention described herein provides a basalt fiber composite rebar utilized with concrete structures that overcomes known disadvantages of those known devices and methods of this general type and that is not subject to (or highly resistant to) corrosion and provides greater tensile force resistance and integrity to concrete structures. Because the rebar is strengthened with continuous basalt fiber, it has a lower density and overall weight, thereby making it more beneficial for use with many structures and significantly less costly to handle, place and ship. Additionally, the outer surface of the fiber-reinforced polymer rebar is less rough and does not include sharp edges and wires that typically cause a safety risk to installers.

Referring now to FIGS. 1-5, one embodiment of the present invention is shown various views. FIGS. 1-5, along with the other figures depicted herein, show several advantageous features of the present invention, but, as will be described below, the invention can be provided in several shapes, sizes, combinations of features and components, and varying numbers and functions of the components. The first example of a fiber-reinforced polymer or enhanced basalt rebar, as shown in FIGS. 1-5, includes a cylindrical and elongated body 102 having an outer surface 108, two opposing terminal ends 104, 106, and a longitudinal length separating the two opposing terminal ends 104, 106. The longitudinal length of the cylindrical and elongated body 102 may be customized to a particular length designed for consumer applications or based on design constraints. The elongated nature of the body 102 is exemplified best in FIG. 4. Said another way, however, the body 102 is preferably formed such that the longitudinal length is greater than the diameter of the body 102 along at least a portion of the body 102 along the longitudinal length.

Figure 1:
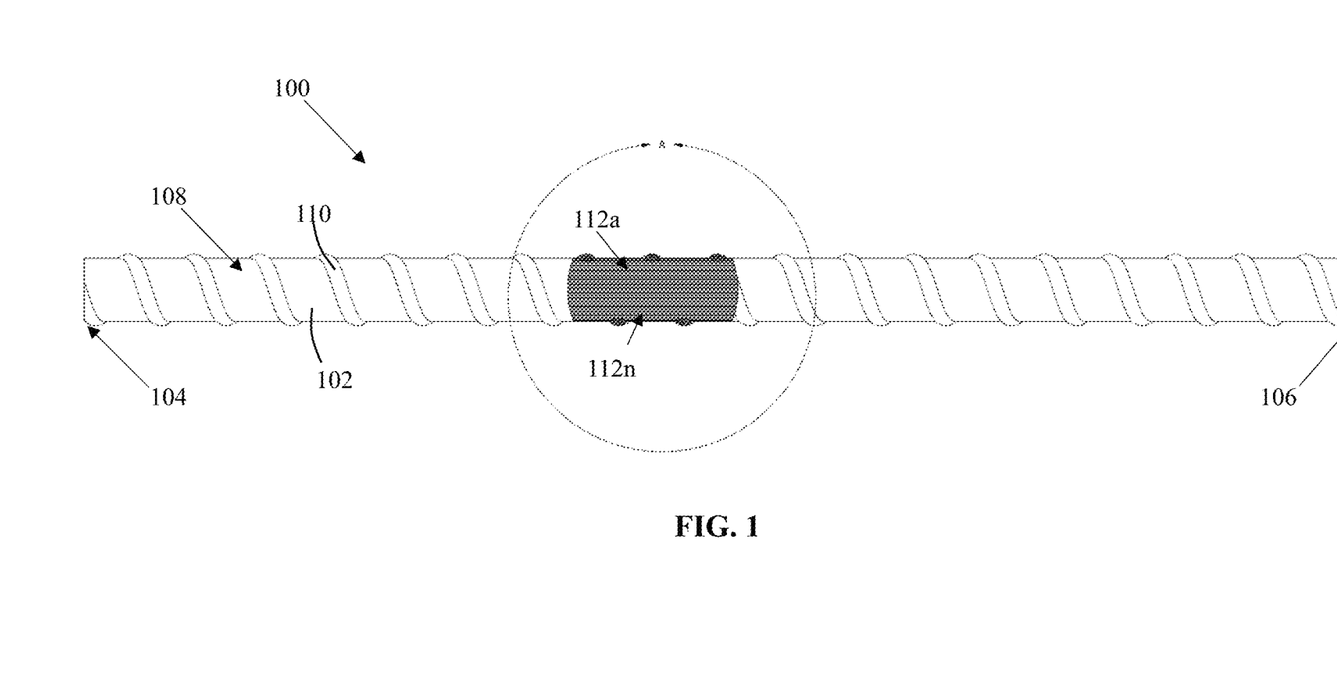
FIG. 1 is an elevational, partially cross-sectional, view of a basalt fiber composite rebar in accordance with one embodiment of the present invention.
Figure 2:
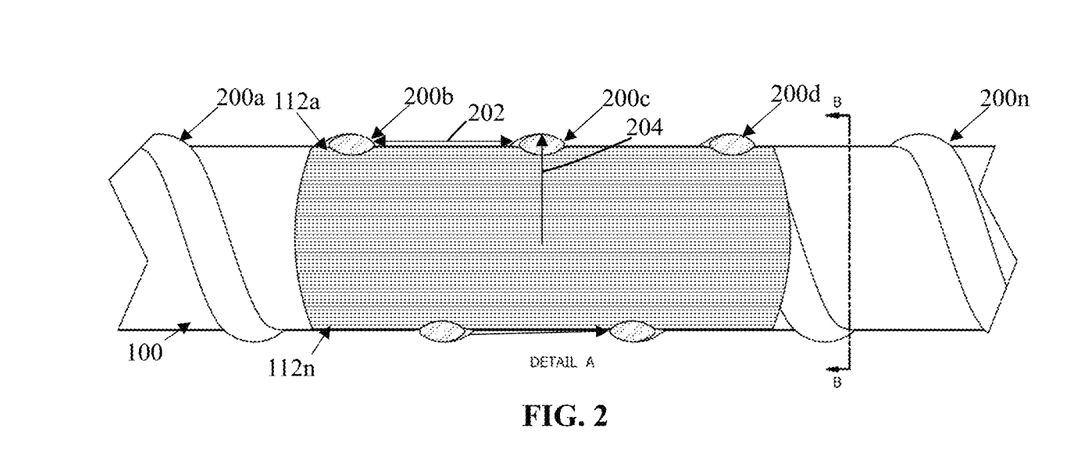
FIG. 2 is a close-up view along section A in FIG. 1 of the basalt fiber composite rebar.
Figure 3:
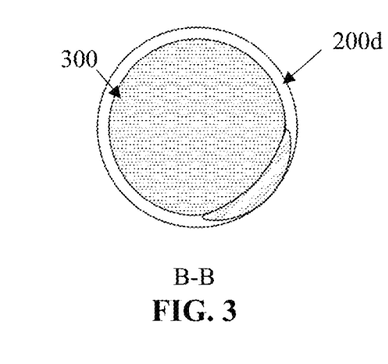
FIG. 3 is a cross-sectional view along section B-B in FIG. 2 of the basalt fiber composite rebar.
Figures 4, 5:
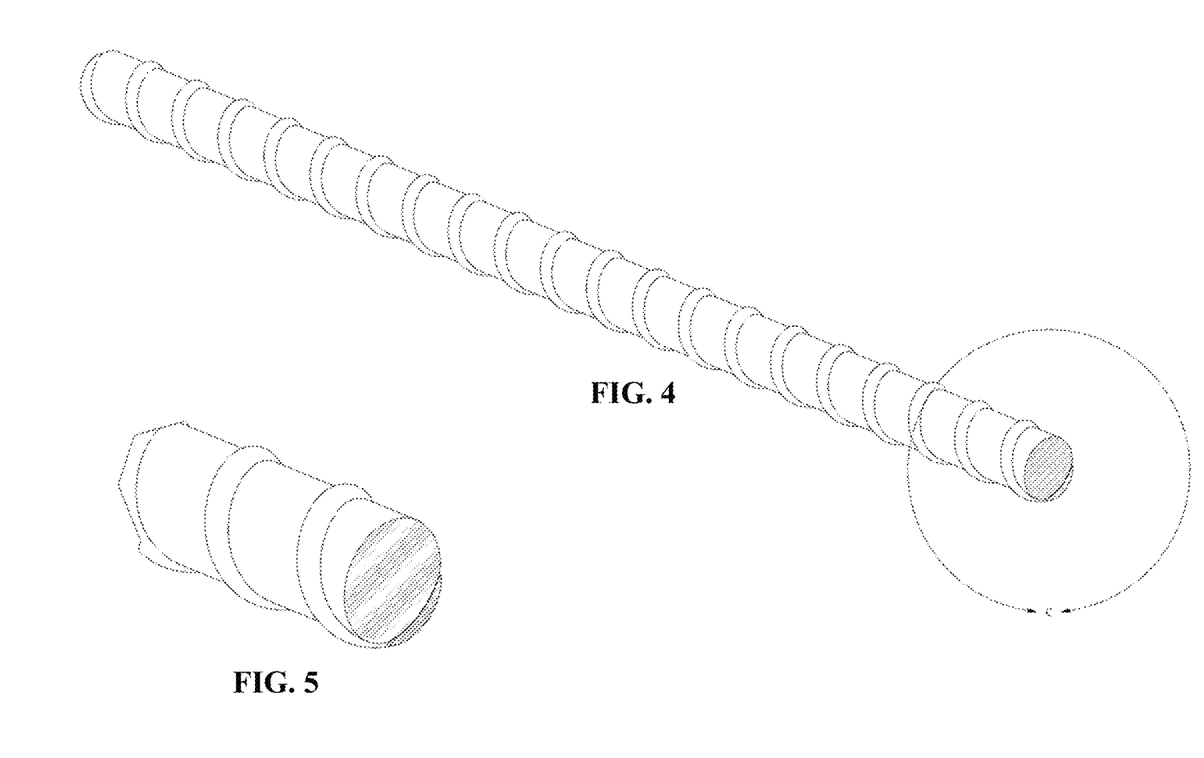
FIG. 4 is a perspective view of the basalt fiber composite rebar in FIG. 1.
FIG. 5 is a close-up view along section C in FIG. 4 of the basalt fiber composite rebar.
Figure 6:
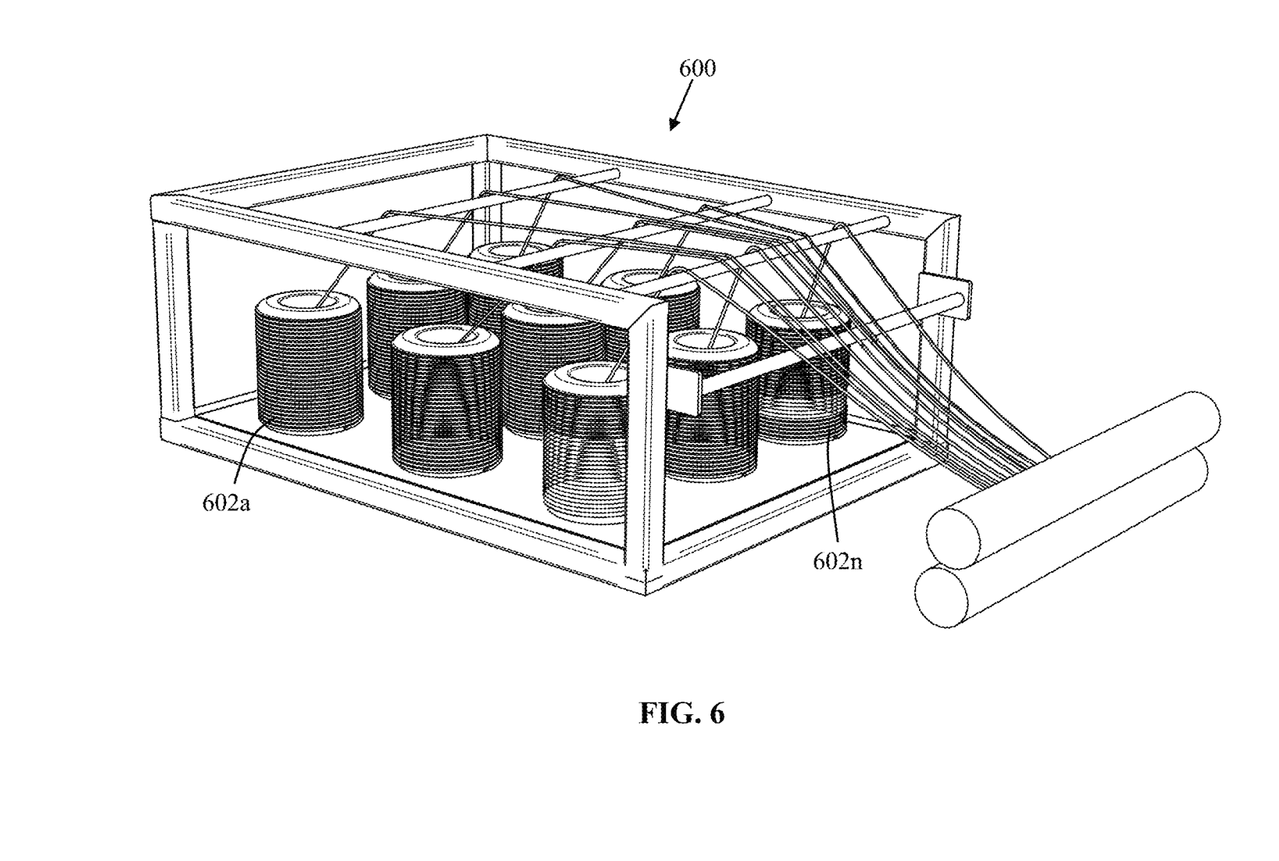
FIG. 6 is a perspective view of a creel rack assembly with a plurality of bobbins retained thereon in accordance with one embodiment of the present invention.
Figure 7A:
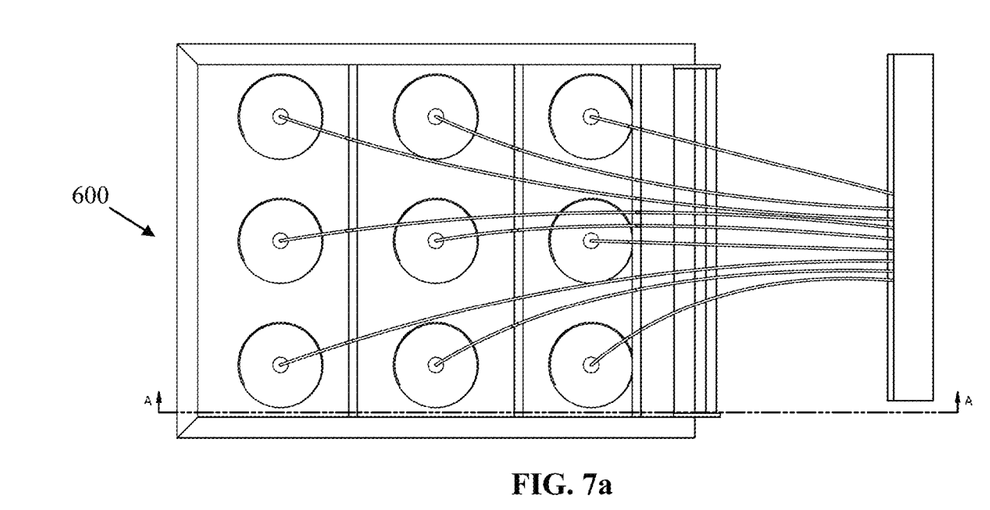
FIG. 7a is a top plan view of the creel rack assembly in FIG. 6
Figure 7B:
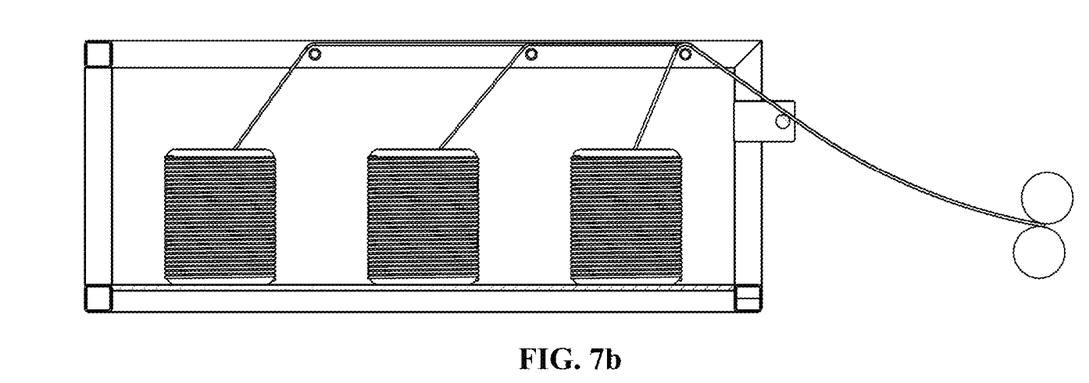
FIG. 7b is a cross-sectional view the creel rack assembly in FIG. 7a along section line A-A in accordance with one embodiment of the present invention.

The cylindrical body 102 is made of an epoxy/polymer matrix having a plurality of longitudinally oriented and twisted basalt fibers 112a-n independently embedded and bonded therein, wherein "n" represents any number greater than one. FIGS. 1-3 depict the configuration of the basalt fibers 112a-n within the matrix 300. The basalt fibers 112a-n may be set within the polymer matrix 300 in a longitudinal configuration and orientation. The basalt fibers 112a-n may continually span along the longitudinal length and are formed with a forming die (depicted best in FIGS. 8-9). In preferred embodiments, the plurality of basalt fibers 112a-n may span the entire longitudinal length of the formed rebar 100. The basalt fibers 112a-n may be embedded and bonded within the matrix 300 chemically as a result of the curing process (discussed herein).

Additionally, a basalt fiber overlay 110 may be directly coupled to the outer surface 108 of the formed cylindrical body 102 in a spiral configuration (best seen FIGS. 1-5). In one embodiment, the ratio of resin-to-fiber in any given cross section along the longitudinal length of the cylindrical body 102 is approximately 1:4, e.g., approximately 70-80% fiber and 20-30% resin, thereby generating a high-strength composite rebar structure. In one embodiment, the epoxy resin matrix 300 may be high molecular weight epoxy resin with a methyltetrahydrophthalic anhydride curing agent. Once formed with the basalt fiber overlay 110, the composite rebar 100 forms a unitary or monolithic structure operably configured for transportation and utilization with concrete or other building material in a safe and effective manner. In further preferred embodiments, the formed composite rebar 100 is of a slender configuration, i.e., the longitudinal length is longer than a diameter of the formed cylindrical body 102 along any given cross-section of the body 102. As seen best in FIG. 2, the basalt fiber overlay 110 defines a plurality of fiber ribs 200a-n spatially displaced from one another and that may be configured in an equally spaced longitudinal length (e.g., longitudinal length 204) and radial length (e.g., radial length 204) configuration with one another and a central or median axis of the body 102, respectively.

In one embodiment, the resin matrix 300 may also beneficially include a plurality of inert fillers inserted within the resin during the formulation process. The fillers may be of a diameter of 19 microns or less and may include or consist of one or more of the following: Basalt fines, wollastonite (CaSiO3), bauxite (aluminum oxide), zirconium or titanium oxides, and/or activated black carbon. The fillers are molecular in size, in the nanometer range, and transfer the stress from loading and forces evenly to the continuous fibers; improving the dimensional stability and toughness while eliminating similar-sized air voids within the resin matrix of the cylindrical body, thereby translating into higher mechanical strengths without changing the polymer matrix. Said another way, the epoxy matrix 300 may further include a unique nanometer-sized filler disposed therein to transfer and help absorb the stress from loads and forces evenly to the continuous fibers and improving the dimensional stability and toughness, while eliminating similar-sized air voids within the resin matrix of the cylindrical body. Said differently, the utilization of a nanometer-sized filler translates into higher mechanical strengths without changing the polymer matrix.

The resin matrix may also include a plurality of plasticizers inserted within the resin during the formulation process to increase the flexibility of the cylindrical body 102. The plurality of plasticizers may include a mixture of oligomeric substances with wetting agents to enhance the wet-out of basalt fibers 112a-n resulting in less air entrapment and porosity, e.g., variations of silane surfactant and/or monoglycidyl ether from a naturally occurring C12-C14 aliphatic alcohol.

The basalt fibers 112a-n and overlay fiber 110 may be of a material made from extremely fine fiber(s) of basalt, which is typically composed of the minerals that include plagioclase, pyroxene, and olivine. Said basalt fibers may be similar to other fiber-reinforced polymers, but have been tested to produce better physico-mechanical properties than fiberglass, and are significantly less expensive than carbon fiber. However, to enable effective and efficient utilization of said fibers in a formed rebar, said formed rebar is made utilizing a beneficial manufacturing process generating the formed rebar configuration described herein.

Figure 11:
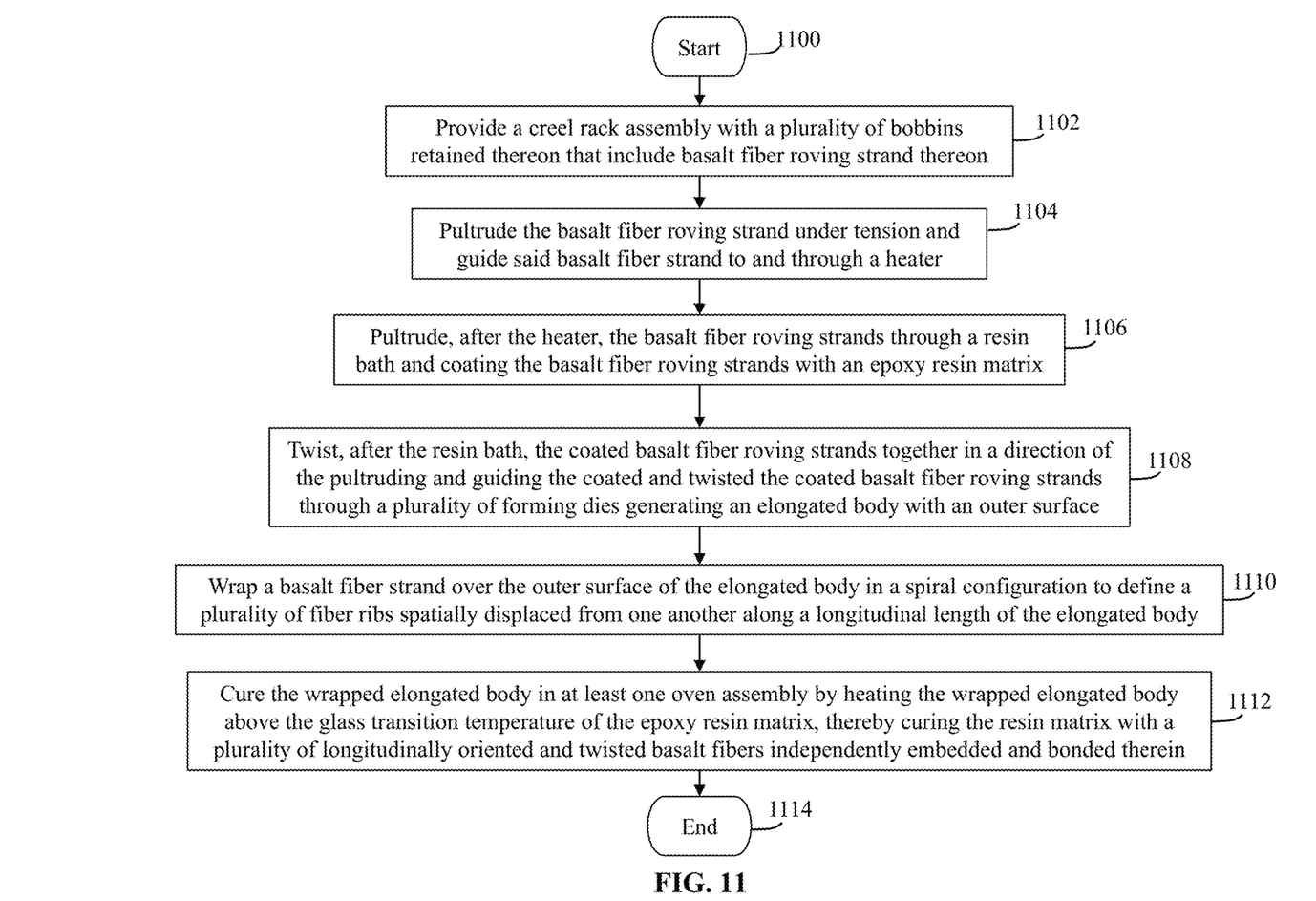
FIG. 11 is a process-flow diagram depicting an exemplary method of manufacturing basalt fiber composite rebar in accordance with one embodiment of the present invention.

Specifically, with reference to FIG. 1 and FIGS. 6-10 in combination with the process-flow diagram depicted in FIG. 11, one exemplary method of manufacturing basalt fiber composite rebar is described. In one exemplary method of manufacturing the basalt fibers forming a composite rebar structure, the process may begin at step 1100 and immediately proceed to a step of formulating the basalt fibers. In one embodiment, the basalt fibers are produced in a one-stage process, e.g., melting, homogenization of basalt, and extraction of fibers. The basalt rebar composition may be heated only once. More specifically, the process may also include the step 1102 of producing a creel rack assembly 600 with a plurality of bobbins 602a-n retained thereon. Said another way, production of the basalt fiber composite rebar may include the basalt fiber roving strand coming from one or more creel rack assemblies, i.e., a creel rack assembly 600 is depicted best in FIG. 6 and FIGS. 7a-7b. The creel rack assembly 600 incudes and retains a plurality of bobbins 602a-n thereon, with each bobbin include basalt fiber roving strand thereon. The basalt fiber roving strand may be twisted of multiple strands or may be of a single untwisted strand of basalt fiber material. In one embodiment, the creel assembly (s) 600 may be approximately 12 ft long×8 ft tall with dual set ups holding up to 180 bobbins per rack. Each creel rack may be equipped with guide arms and tensioners to control and direct the roving fibers coming off of the bobbins 602a-n (sequentially or simultaneously), or center-pulled from each of the bobbins.

The production may also begin with setting all of the unique parameters into the pultrusion line's programming logic control (PLC) or otherwise programming a software application, thereby controlling the speed and length of basalt fiber leaving each of the bobbins 602a-n. The temperatures and speeds of the basalt fiber roving leaving the bobbins are at least partially dictated by the individual composite rebar size desired. The basalt fiber roving may be of high tenacity (e.g., having a tensile strength of approximately 3000 MPa) continuously leaving the bobbins, which may be of weight of approximately 10-15 kg and coated with a process surfactant for an optimum bond with the resin matrix. The total number of basalt roving strands 800a-n needed for each cylindrical body may be predicated on the mechanical properties of the body 102 being produced. Specifically, with reference to schematic diagram depicted in FIG. 8, the basalt fiber strands 800a-b may be brought together under precise tension to avoid a catenary effect and combined into a single and horizontal plane (best seen in FIG. 9). Next, step 1104 may include pultruding the basalt fiber roving strand under tension from each of the plurality of bobbins and guiding the basalt fiber strand from each of the plurality of bobbins to and through a heater 802. Said another way, the basalt fiber strand may span to and through an infrared or ultraviolet heating stage (or heater 802) to dry the basalt roving strands 800a-n and prepare the strands 800a-n for bonding with the resin matrix. The heater 802 may uniformly apply infrared or ultraviolet radiation to the basalt roving strands 800a-n.

Figure 8:
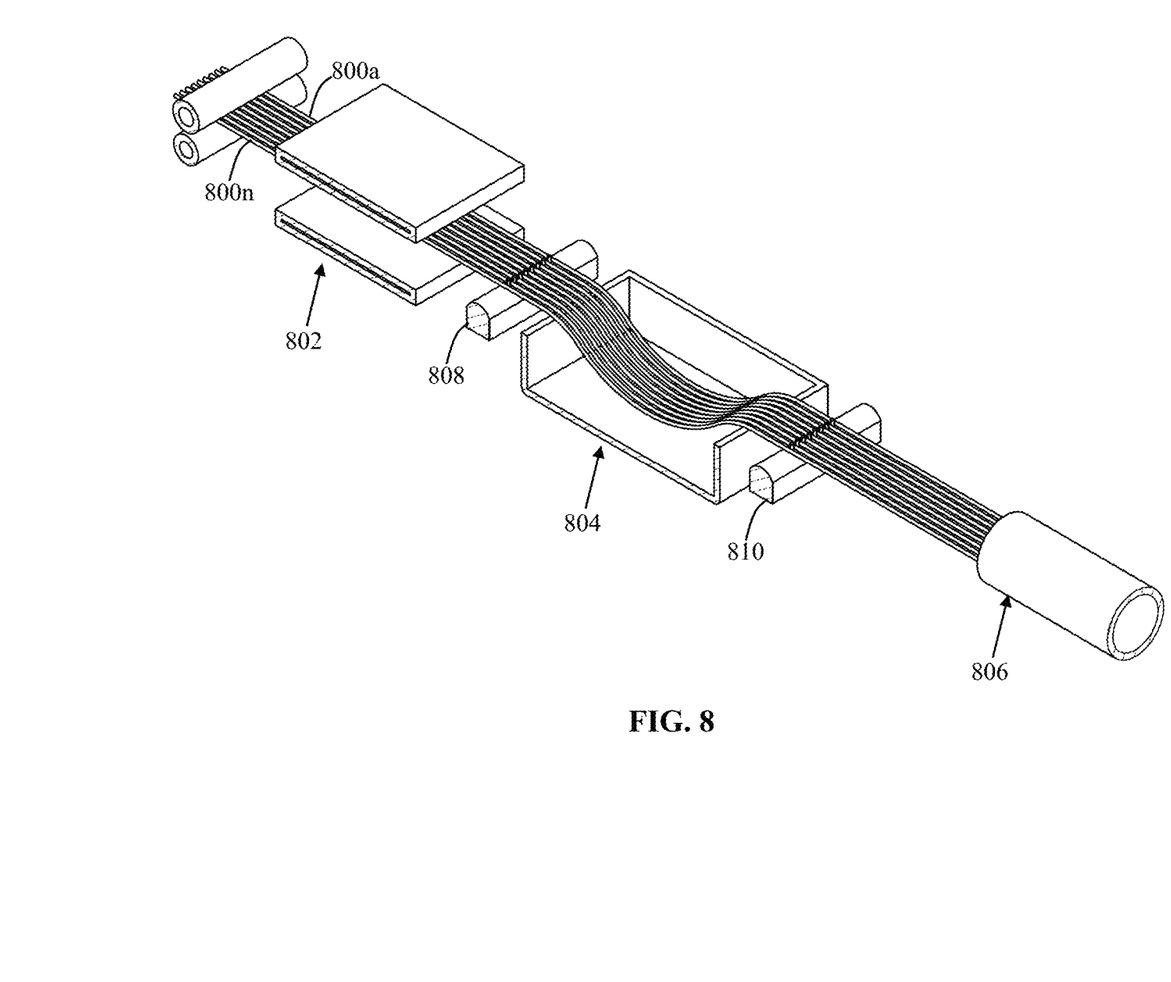
FIG. 8 is a fragmentary schematic depicting an exemplary method of manufacturing basalt fiber composite rebar in accordance with one embodiment of the present invention.

Before and after the basalt roving strands 800a-n are exposed to a resin bath 804, the basalt roving strands 800a-n may then be exposed and pass through a separator. To that end, step 1106 includes pultruding, after the heater 802, the basalt fiber roving strands 800a-n through a resin bath 804 and coating the basalt fiber roving strands 800a-n with an epoxy resin matrix. Thereafter, the basalt fiber roving strands 800a-n are then pultruded to one or more forming dies (wherein an exemplary forming die 806 is depicted in FIG. 8). In one embodiment, the basalt fiber roving strands are directed toward a series of forming dies. Described another way, once dried, the roving strands 800a-n are passed through and fully submerged in the resin matrix bath 804 housed in a containing structure. As such, the basalt roving strands 800a-n are exposed to a thorough wet-out and/or impregnating the fibers to form the elongated and/or cylindrical body 102. The resin bath 804 may be supplied by an injection system to keep the materials separate until their time of use. The resin bath 804 is maintained at a certain temperature to have a proper viscosity and/or phase of material and is filled at a certain depth for proper fiber strand coverage. Said another way, the resin bath 804 may be of a sufficient capacity to completely submerse the basalt roving strands 800a-n therein.

Figure 9:
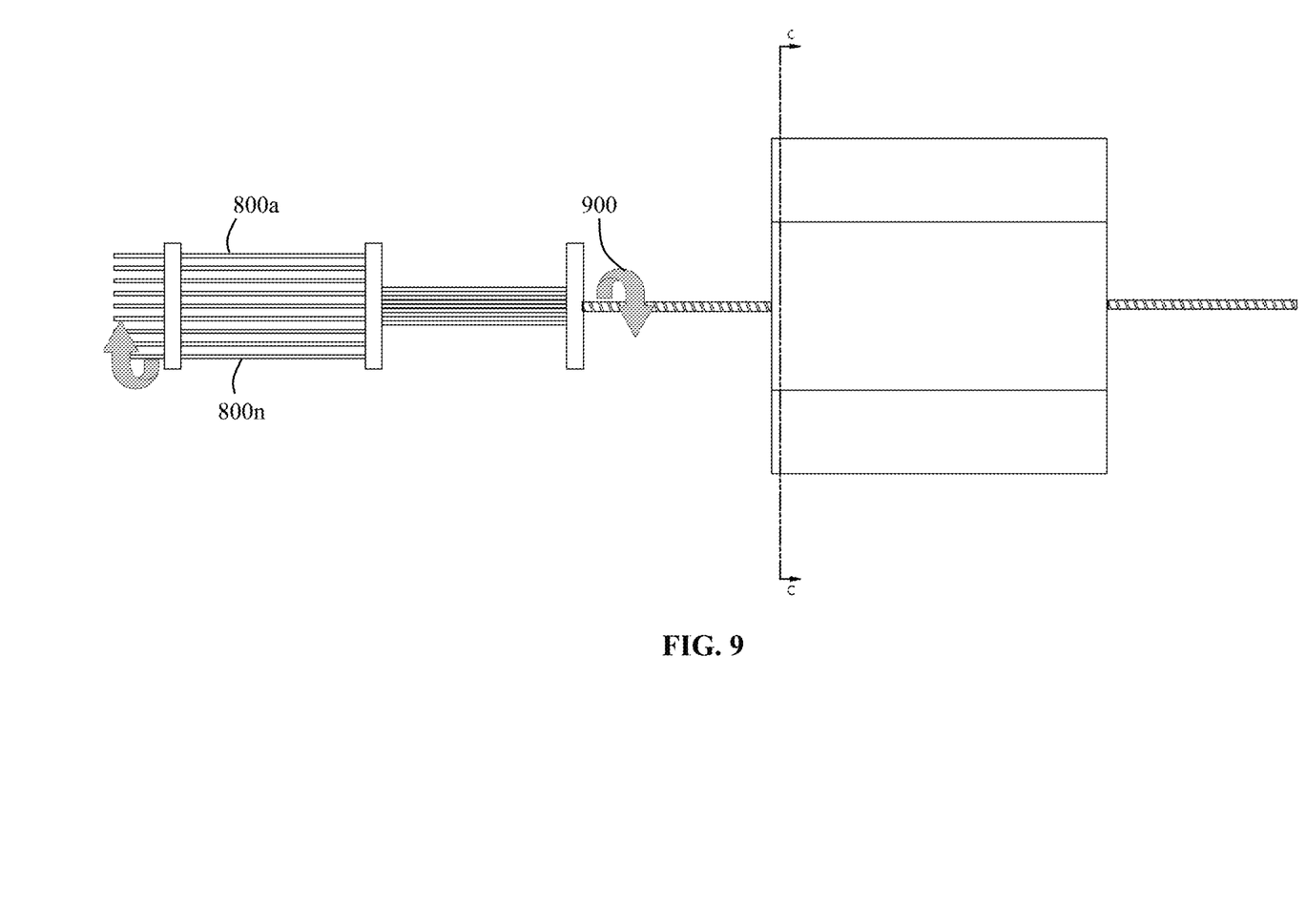
FIG. 9 is a fragmentary schematic depicting an exemplary step in the method of manufacturing basalt fiber composite rebar that includes basalt fibers deckled down to the forming die where a counterclockwise twist is applied in accordance with one embodiment of the present invention.

The roving strands 800a-n are preferably and beneficially made to twist into a "Z" direction or clockwise or, preferably, counterclockwise direction to the longitudinal or pultrusion direction prior to being pulled through one or more forming dies 806, sized to be commensurate with the intended bar diameter. Said another way, step 1108 may include twisting, after the resin bath, the coated basalt fiber roving strands together in a direction of the pultruding and guiding the coated and twisted the coated basalt fiber roving strands to at least one forming die generating an elongated body with an outer surface. The twisting of the basalt fiber roving strands 800a-n can also be seen represented in FIG. 9 with arrow 900. FIG. 9 depicts a top and fragmentary view of the production process depicted in FIG. 8, wherein the fibers 800a-n can also be seen deckled down to the forming die where the counter-clockwise twist is applied and to generate the elongated body described above. Said another way, the process may include deckling down the basalt fiber roving strands (seen best in FIG. 9) using at least one separator 810 operably coupled to the basalt fiber roving strands 800a-n before the resin bath 804. Further, the process may include pultruding the basalt fiber roving strands 800a-n through a separator 808 disposed before the resin bath 804 and a separator 810 after the resin bath 804.

Once formed to a specific bar or body size (diameter), the cylindrical and/or elongated body 102 may be immediately externally wrapped over the outer surface 108 of the body 102 with an assembled strand of basalt fibers, having a size of approximately 2000-4800 tex. Said another way, step 1110 in the process may include wrapping a basalt fiber strand 110 over the outer surface 108 of the elongated body 102 in a spiral configuration to define a plurality of fiber ribs 200a-b spatially displaced from one another along a longitudinal length of the elongated body and raised above the outer surface 108 of the body 102 (a length dictated at least partially by the diameter of the basalt fiber strand(s) 110.

The overlaid basalt fiber(s) or strand(s) may be applied in the spiral or "S" direction over the outer surface 108 of the elongated body 102. This spiral pattern or configuration, which is preferably applied in the opposite configuration and direction of the twist of the fibers 112a-n, allows the body 102 to work "into" itself while still under linear tension in the pultrusion process, thereby causing an additional constriction of the pre-cured bar and helping to further eliminate potential air voids. The outer wrap of basalt fiber 110 may be applied under the influence of a separate tension mechanism allowing the proper contact for resin coating, but not so tight as to deform the linear structure of the basalt roving strands. Further, the outer surface wrapped basalt fiber 110 may also be preferably tied directly to the speed of the puller unit, thus avoiding any over-wrapping or under-wrapping. Finally, the outer wrap is timed to provide a particular number of spirals per foot and at equal interval spacing from one another. Said another way, the process may include wrapping the basalt fiber strand 110 over the outer surface 108 of the elongated body 102 at a rate directly associated with a rate of pultruding of the basalt fiber roving strands 800a-n. At the range of 28-34 spirals per foot (depending on the size of the rebar body 102), dimensional stability and increase of modulus of elasticity is added to the rebar.

Figure 10:
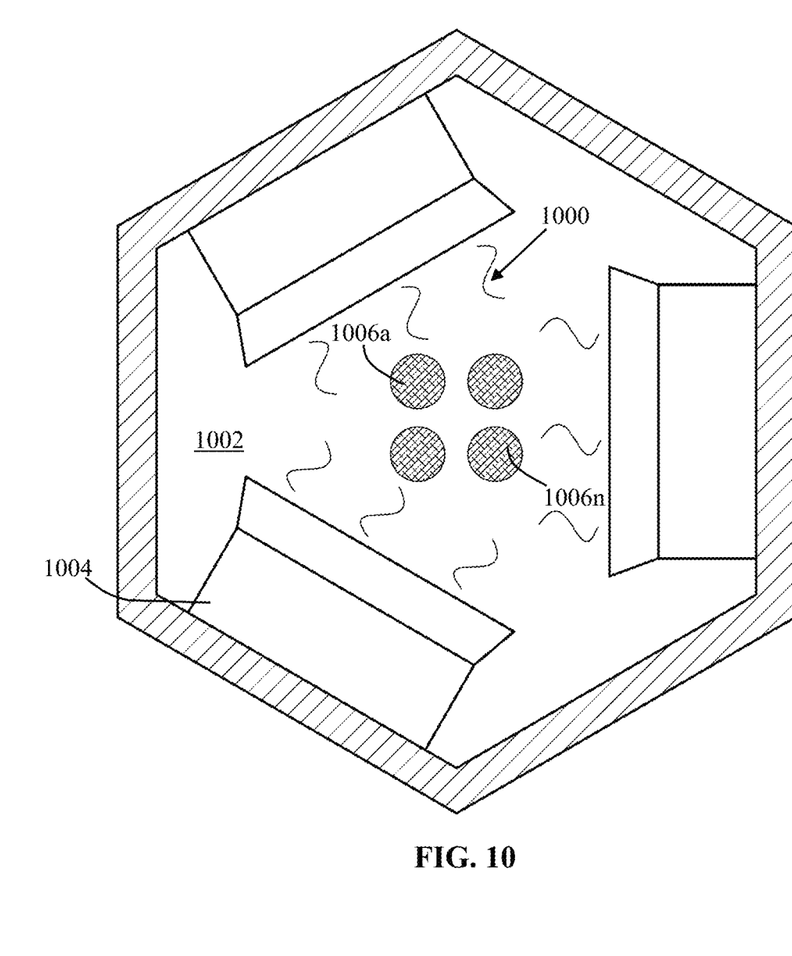
FIG. 10 is a cross-sectional view along section line C-C in FIG. 9 depicting an exemplary step in the method of manufacturing basalt fiber composite rebar that includes the formed rebar subjected to a misting of black carbon thereby forming a coating thereon in accordance with one embodiment of the present invention.

With reference to FIG. 10, prior to entering the oven system to cure, the composite rebar with the wrapped basalt fiber 110 may be subjected to a dry coating of black carbon 1000, applied through an air "misting" chamber 1002 using air inputs 1004 and a carbon material input to evenly coat each of the rebar bodies 1006a-n spanning through the chamber 1002 to increase the overall strength characteristics and surface area. The roving basalt fiber may then be pulled through a "misting" of external coating material before entering the curing ovens. The external coating may be applied in a 360-degree fashion due to the misting effect as depicted best in FIG. 10, thereby adhering to the latent glazing on the outside of the precured bar and causing an "ultra-high surface area" condition.

Once the rebar composite enters the oven system, it is brought to, and passed the glass transition temperature. Said another way, step 1112 may include curing the wrapped elongated body in an oven assembly by heating the wrapped elongated body to at least a glass transition temperature of the epoxy material, thereby forming an epoxy matrix with a plurality of longitudinally oriented and twisted basalt fibers independently embedded and bonded therein. The temperatures in the curing oven may be regulated and independent across four separate oven chambers to achieve a complete cure throughout the entire rebar. The bar exits the ovens [cured] and is subjected to a chilled water quench—locking the cure and cooling the bar prior to it entering the pulling and cutting stations to the desired length. As such, a fiber-reinforced polymer or enhanced basalt rebar is disclosed that is non-corrosive, non-conductive, and stronger than event steel rebar (whether embedded in concrete and/or alone before embedded in concrete). The above-described process may terminate at step 1114.

Although a specific order of executing the process steps has been disclosed, the order of executing the steps may be changed relative to the order shown in certain embodiments. Also, two or more steps shown in succession may be executed concurrently or with partial concurrence in some embodiments. Certain steps may also be omitted for the sake of brevity. In some embodiments, some or all of the process steps can be combined into a single process.

What is claimed is:

1. A method of manufacturing basalt fiber composite rebar comprising the steps of:
   providing a creel rack assembly with a plurality of bobbins retained thereon, each of the plurality of bobbins including basalt fiber roving strand thereon;
   pultruding the basalt fiber roving strands under tension from each of the plurality of bobbins and guiding the basalt fiber strands to and through a heater;
   deckling down the basalt fiber roving strands using at least one separator operably coupled to the basalt fiber roving strands before a resin bath;
   pultruding, after the heater, the basalt fiber roving strands through the resin bath and coating the basalt fiber roving strands with an epoxy resin matrix;
   twisting, after the resin bath, the coated basalt fiber roving strands together in a direction of the pultruding and guiding the coated and twisted coated basalt fiber roving strands through a plurality of forming dies to generate an elongated body with an outer surface and the twisted basalt fibers forming a cross section of the elongated body along the direction of the pultruding;
   wrapping a basalt fiber strand over the outer surface of the elongated body and around the twisted basalt fibers forming the cross section of the elongated body in a spiral configuration to define a plurality of fiber ribs spatially displaced from one another along a longitudinal length of the elongated body; and
   curing the wrapped elongated body in at least one oven assembly by heating the wrapped elongated body above the glass transition temperature of the epoxy resin matrix, thereby curing the resin matrix with a plurality of longitudinally oriented and twisted basalt fibers independently embedded and bonded therein.

2. The method according to claim 1, further comprising:
   pultruding the basalt fiber roving strands under tension from the plurality of bobbins to form a single horizontal plane before the coating of the basalt fiber roving strands.

3. The method according to claim 1, further comprising:
   pultruding the basalt fiber roving strands through a separator disposed before the resin bath and after the resin bath.

4. The method according to claim 1, further comprising:
   twisting the coated basalt fiber roving strands in a counterclockwise direction with respect to the direction of the pultruding to form a ratio of resin-to-twisted basalt fiber in any given cross section along the direction of the pultruding of approximately 1:4.

5. The method according to claim 4, further comprising:
   wrapping the basalt fiber strand over the outer surface of the elongated body in a clockwise direction as a circumferential retaining element to form the spiral configuration.

6. The method according to claim 1, further comprising:
   wrapping the basalt fiber strand over the outer surface of the elongated body while the basalt fiber roving strands is pultruding.

7. The method according to claim 1, further comprising:
   wrapping the basalt fiber strand over the outer surface of the elongated body at a rate directly associated with a rate of pultruding of the basalt fiber roving strands.

8. The method according to claim 1, further comprising:
   pultruding, after wrapping the basalt fiber strand over the outer surface of the elongated body in the spiral configuration, the elongated body through an air misting chamber and subjecting the wrapped elongated body with a dry coating evenly applied to the entire outer surface of the elongated body, thereby forming an increased surface area for enhanced bonding.

9. A method of manufacturing basalt fiber composite rebar comprising the steps of:
   providing a creel rack assembly with a plurality of bobbins retained thereon, each of the plurality of bobbins including basalt fiber roving strand thereon;
   pultruding the basalt fiber roving strands under tension from each of the plurality of bobbins and guiding the basalt fiber strands to and through a heater;
   pultruding, after the heater, the basalt fiber roving strands through a resin bath and coating the basalt fiber roving strands with an epoxy resin matrix;
   twisting, after the resin bath, the coated basalt fiber roving strands together in a direction of the pultruding and guiding the coated and twisted coated basalt fiber roving strands through a plurality of forming dies generating an elongated body with an outer surface;
   wrapping a basalt fiber strand over the outer surface of the elongated body in a spiral configuration to define a plurality of fiber ribs spatially displaced from one another along a longitudinal length of the elongated body;

pultruding, after wrapping the basalt fiber strand over the outer surface of the elongated body in the spiral configuration, the elongated body through an air misting chamber and subjecting the wrapped elongated body with a dry coating evenly applied to the entire outer surface of the elongated body; and curing the wrapped elongated body in at least one oven assembly by heating the wrapped elongated body above the glass transition temperature of the epoxy resin matrix, thereby curing the resin matrix with a plurality of longitudinally oriented and twisted basalt fibers independently embedded and bonded therein.

10. A method of manufacturing basalt fiber composite rebar comprising the steps of:

providing a creel rack assembly with a plurality of bobbins retained thereon, each of the plurality of bobbins including basalt fiber roving strand thereon;

pultruding the basalt fiber roving strands under tension from each of the plurality of bobbins and guiding the basalt fiber strands to and through a heater;

pultruding, after the heater, the basalt fiber roving strands through a resin bath and coating the basalt fiber roving strands with an epoxy resin matrix;

twisting, after the resin bath, the coated basalt fiber roving strands together in a direction of the pultruding and guiding the coated and twisted coated basalt fiber roving strands through a plurality of forming dies to generate an elongated body with an outer surface and the twisted basalt fibers forming a cross section of the elongated body along the direction of the pultruding;

wrapping a basalt fiber strand over the outer surface of the elongated body and around the twisted basalt fibers forming the cross section of the elongated body in a spiral configuration to define a plurality of fiber ribs spatially displaced from one another along a longitudinal length of the elongated body;

pultruding, after wrapping the basalt fiber strand over the outer surface of the elongated body in the spiral configuration, the elongated body through an air misting chamber and subjecting the wrapped elongated body with a dry coating evenly applied to the entire outer surface of the elongated body, thereby forming an increased surface area for enhanced bonding; and curing the wrapped elongated body in at least one oven assembly by heating the wrapped elongated body above the glass transition temperature of the epoxy resin matrix, thereby curing the resin matrix with a plurality of longitudinally oriented and twisted basalt fibers independently embedded and bonded therein.

* * * * *